(12) United States Patent
Mezer

(10) Patent No.: US 7,239,665 B2
(45) Date of Patent: Jul. 3, 2007

(54) SELECTION OF PRE-COMPUTED EQUALIZER BASED ON CHANNEL CHARACTERISTIC

(75) Inventor: Amir Mezer, Haifa (IL)

(73) Assignee: Intel Corporation, Santa Clara, CA (US)

( * ) Notice: Subject to any disclaimer, the term of this patent is extended or adjusted under 35 U.S.C. 154(b) by 784 days.

(21) Appl. No.: 10/721,003

(22) Filed: Nov. 24, 2003

(65) Prior Publication Data

US 2005/0111559 A1    May 26, 2005

(51) Int. Cl.
*H04B 3/00* (2006.01)
(52) U.S. Cl. .................................................... 375/257
(58) Field of Classification Search .................. 375/257, 375/229, 230, 232
See application file for complete search history.

(56) References Cited

U.S. PATENT DOCUMENTS

| | | | | |
|---|---|---|---|---|
| 4,078,157 | A * | 3/1978 | Lender et al. | 375/214 |
| 4,303,896 | A * | 12/1981 | Slabinski | 333/28 R |
| 5,708,703 | A * | 1/1998 | Nagaraj | 379/340 |
| 6,304,599 | B1 * | 10/2001 | Igarashi | 375/232 |
| 6,438,163 | B1 * | 8/2002 | Raghavan et al. | 375/233 |
| 2003/0138040 | A1 * | 7/2003 | Rouphael et al. | 375/233 |
| 2004/0037354 | A1 * | 2/2004 | Jayaraman et al. | 375/229 |

* cited by examiner

*Primary Examiner*—Khai Tran
(74) *Attorney, Agent, or Firm*—Buckley, Maschoff & Talwalkar LLC

(57) ABSTRACT

In some embodiments, a method includes determining a characteristic of a communication channel and selecting, on the basis of the determined characteristic, a pre-computed equalizer characteristic for application to signals received via the communication channel.

13 Claims, 6 Drawing Sheets

SELECTION OF PRE-COMPUTED EQUALIZER BASED ON CHANNEL CHARACTERISTIC

BACKGROUND

A typical physical communication channel, such as an Ethernet cable, introduces inter-symbol interference (ISI) in the received data signal. To minimize the adverse effects of ISI and to improve signal to noise ratio (SNR), it is customary to include in the receiver a filter known as an "equalizer". In some receivers, the entire equalizer is adaptive, but in such cases convergence of the equalizer may be rather slow. In other receivers a fixed equalizer is used in combination with an adaptive equalizer to provide improved convergence. However, even with use of a fixed equalizer and an adaptive equalizer in combination, convergence of the adaptive equalizer may be slower than is desirable.

DETAILED DESCRIPTION

Figure 1:
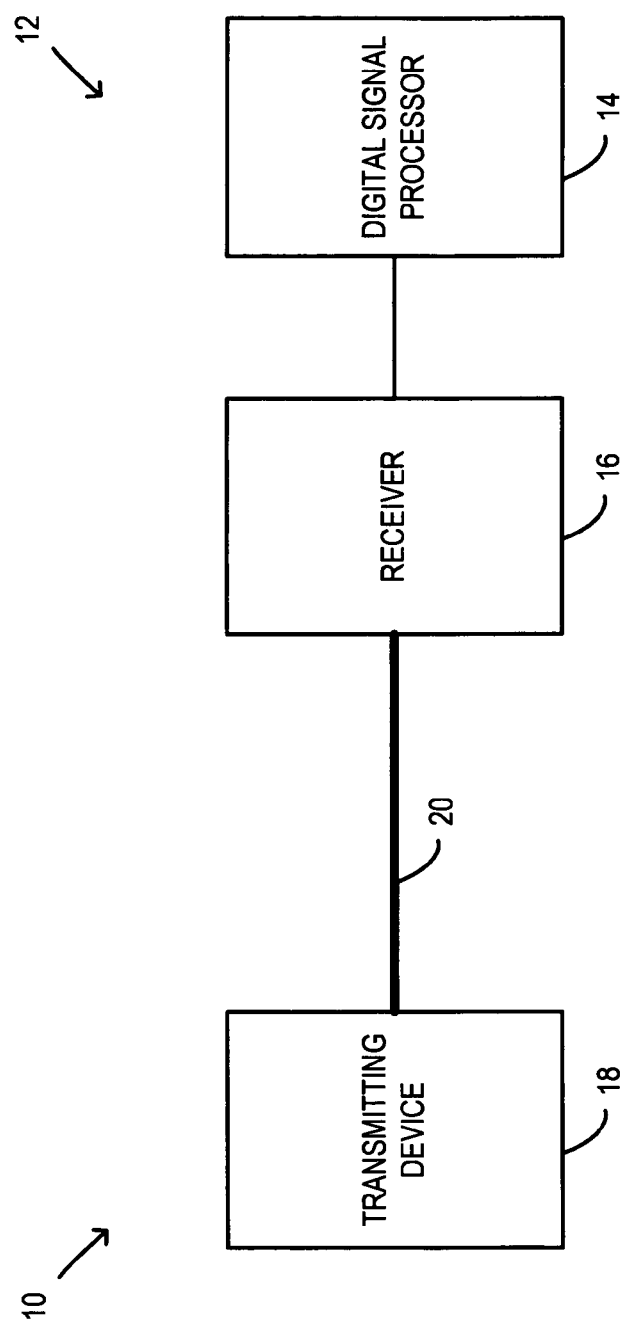
FIG. 1 is block diagram of an electronic apparatus provided according to some embodiments.

FIG. 1 is a block diagram of an apparatus 10 provided according to some embodiments. The apparatus includes a network controller 12 which includes a digital signal processor 14 coupled to a receiver 16. The network controller 12 may also include other components, which are not shown, but which may be coupled to the digital signal processor 14.

In other embodiments, the receiver may be part of a computer system and may be coupled to a general purpose processor to which other components such as volatile and non-volatile memory devices, mass storage and input/output devices may be coupled.

The apparatus 10 also includes a transmitting device 18 and a communication channel 20 which couples the transmitting device 18 to the receiver 16 of the network controller 12. The transmitting device 18 may send data signals to the receiver 16 via the communication channel 20. The communication channel 20 may include a standard cable (not separately shown) such as a Gigabit Ethernet cable.

Although not indicated in the drawing, the network controller 12 may also include a transmitter, which may be integrated with the receiver 16 in the form of a data transceiver that is coupled to the digital signal processor 14. The transmitting device 18 may also have a data receiving capability to receive data transmitted by the network controller 12 over the communication channel 20.

Figure 2A:
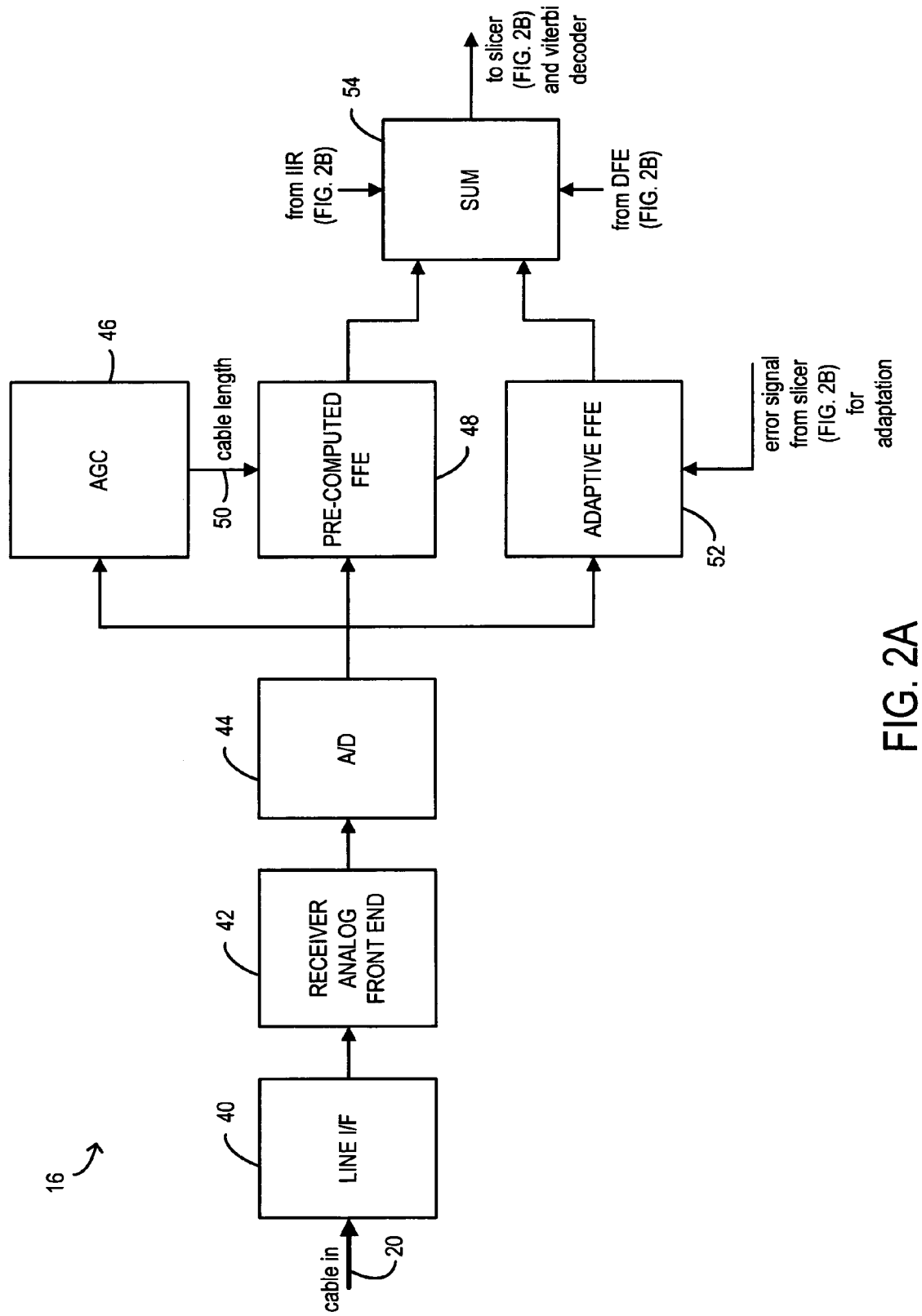
FIGS. 2A and 2B together form a block diagram of a receiver that is part of the apparatus of FIG. 1.
Figure 2B:
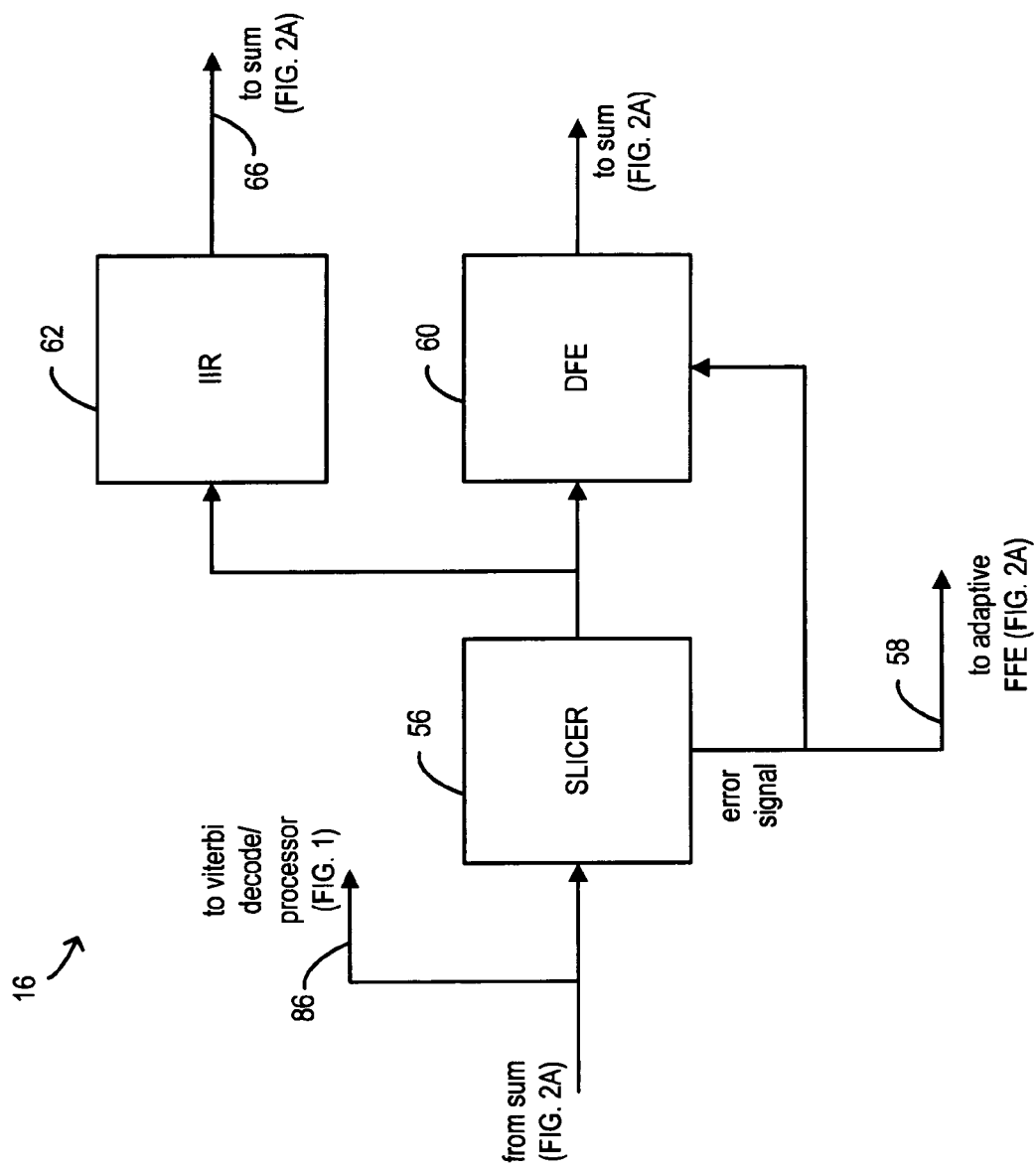

FIGS. 2A and 2B together form a block diagram of the receiver 16.

As seen from FIG. 2A, the receiver 16 includes a line interface 40 by which the receiver 16 is coupled to the communication channel (cable) 20. Also included in the receiver 16 are receiver analog front end electronics 42. The receiver analog front end electronics 42 are coupled to the line interface 40 to receive the signals received via the cable 20. The receiver analog front end electronics 42 may perform signal conditioning on the incoming signals in accordance with conventional practices.

The receiver 16 further includes an analog-to-digital converter 44 which is coupled to the receiver analog front end electronics 42 to receive the incoming signals. The analog-to-digital converter 44 converts the incoming signals into a stream of digital samples.

The receiver 16 also includes an automatic gain control (AGC) circuit (or block) 46 which is coupled to the analog-to-digital converter 44 to receive the stream of digital samples output by the analog-to-digital converter 44. The AGC circuit 46 may operate in accordance with conventional principles and, as a part of its conventional operation, may determine a characteristic of the communication channel 20 such as an approximate length of the cable which constitutes the communication channel 20.

Also included in the receiver 16 is a pre-computed feed forward equalizer (FFE) block 48. The pre-computed FFE block 48 is coupled to the analog-to-digital converter 44 to receive the stream of digital samples output by the analog-to-digital converter 44. In addition, as indicated at 50, the pre-computed FFE block 48 is also coupled to the AGC circuit 46 to receive a signal from the AGC circuit 46 that is indicative of the communication channel characteristic (e.g., approximate cable length) determined by the AGC circuit 46. Details of the pre-computed FFE block 48 will be described below with reference to FIG. 3.

The receiver 16 further includes an adaptive feed forward equalizer (FFE) 52 which is coupled to the analog-to-digital converter 44 to receive the stream of digital samples output by the analog-to-digital converter 44. It should be understood that the adaptive FFE 52 and the pre-computed FFE block 48 may both be considered to be coupled to the line interface 40 via the receiver analog front end electronics 42 and the analog-to-digital converter 44 and may be considered to be coupled to the line interface 40 in parallel with each other.

The adaptive FFE 52 may operate in accordance with conventional principles and may, together with the pre-computed FFE block 48 and other components described below, operate to equalize the incoming signals to reduce or substantially eliminate inter-symbol interference (ISI) in the incoming signals. The adaptive FFE 52 may adapt the equalizer characteristic it applies to the incoming signals on the basis of an error signal received from a signal slicer block which will be described below.

There is also included in the receiver 16 a summing block 54. The summing block 54 is coupled to the pre-computed FFE block 48 and to the adaptive FFE 52 to receive, as input signals, respective outputs provided by the pre-computed FFE block 48 and the adaptive FFE 52. These outputs are the incoming signals, as at least partially equalized with respective equalizer characteristics applied by the pre-computed FFE block 48 and the adaptive FFE 52. In addition, the summing block receives other inputs from components which will be described below. The summing block 54 operates to sum its input signals to produce an output signal.

Referring now to FIG. 2B, the receiver 16 also includes a signal slicer block 56. The signal slicer block 56 is coupled to the summing block 54 to receive the output of the summing block 54.

The signal slicer block 56 may operate in accordance with conventional principles to produce two output signals. A first output of the signal slicer block 56 may reflect a filtered and/or equalized signal output from the summing block 54 and may contain the data to be recovered from the incoming signals. The second output of the signal slicer block 56 may be an error signal that indicates deviation of the output of the summing block 54 from a pre-determined ideal signal profile. The error signal, as indicated at 58, may be fed back to the adaptive FFE 52 (FIG. 2A) to control the adaptive operation of the adaptive FFE 52.

Continuing to refer to FIG. 2B, the receiver 16 may also include a decision feedback equalizer (DFE) 60 which may be coupled to the signal slicer block 56 to receive the first output of the signal slicer block 56. The DFE 60 may operate in accordance with conventional principles to adaptively apply an equalizer characteristic to the first output of the signal slicer block 56. The equalizer characteristic applied by the DFE 60 may be adapted based on the error signal output by the signal slicer block 56. The resulting output of the DFE 60 is fed back to the summing block 54 (FIG. 2A) as one of the inputs of the summing block 54.

The receiver 16 may also include an infinite impulse response (IIR) filter 62 which may be coupled to the signal slicer block 56 to receive the first output of the signal slicer block 56. The IIR filter 62 may operate in accordance with conventional principles to apply a filter characteristic to the first output of the signal slicer block 56. The resulting output of the IIR filter 62 may be fed back (as indicated at 66 in FIG. 2B) to the summing block 54 (FIG. 2A) as one of the inputs of the summing block 54. In some embodiments, the IIR filter 62 may be integrated with the above-mentioned Viterbi decoder, which is not shown.

Figure 3:
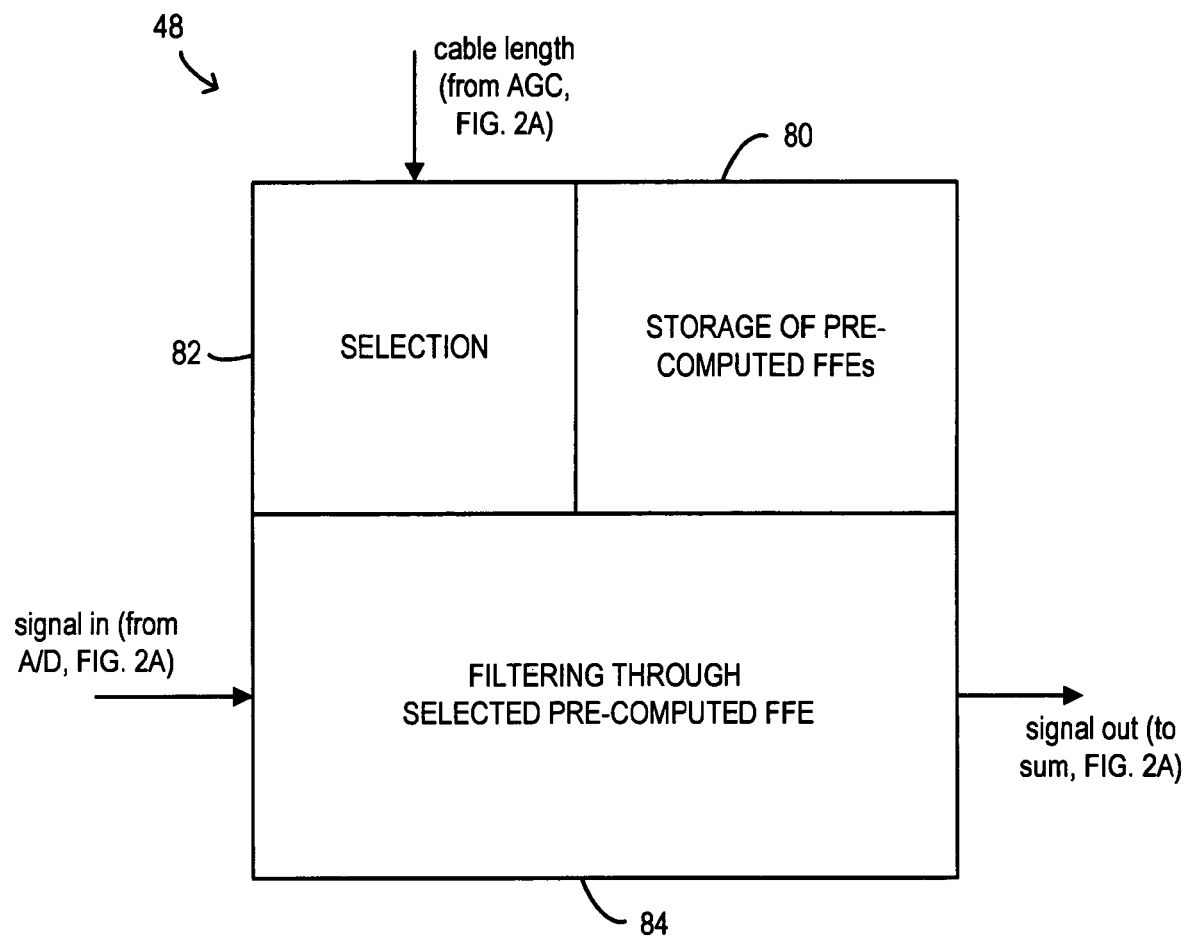
FIG. 3 illustrates in block form some details of a pre-computed feed forward equalizer (FFE) block of the receiver of FIGS. 2A and 2B.

Referring now to FIG. 3, details of the pre-computed FFE block 48 will now be described.

As indicated at 80 in FIG. 3, the pre-computed FFE block 48 includes a capability for storing a number of pre-computed FFE characteristics. Each of these characteristics may correspond to a respective possible length of a cable to which the receiver 16 may be coupled. Each of these characteristics may be pre-computed according to the following procedure.

Figure 4:
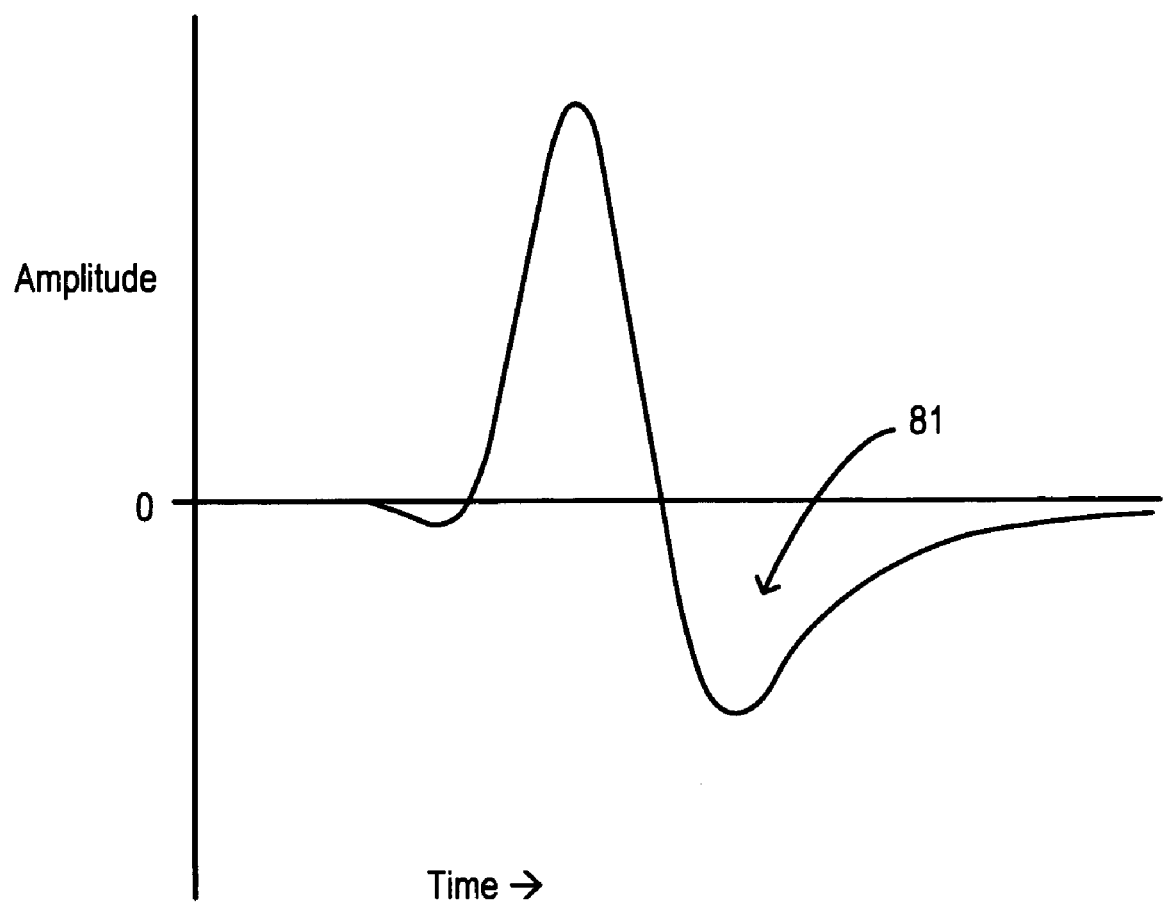
FIG. 4 is graph that illustrates a desirable equalizer output in the receiver of FIGS. 2A and 2B.

(a) First, a desired equalizer output signal profile may be determined. This equalizer output signal profile may be represented as a sequence of digital samples and will hereinafter referred to with the symbol "A". FIG. 4 is a graphical representation of one example of a desired equalizer output signal profile. It will be observed that the desired output signal profile has a "trough" indicated at 81 in FIG. 4. In practice this trough may be eliminated by functioning of the above-mentioned IIR filter 62.

(b) Next, for a particular length of cable, an anticipated equalizer input signal may be generated. This may be done by transmitting a test signal (e.g., a sequence of "0" value signals followed by a sequence of "1" value signals) via a cable having the particular length in question and receiving the resulting signal (including ISI) at the output end of the cable, and analog-to-digital converting the signal at the output end of the cable to generate the anticipated equalizer input signal, which will hereinafter be referred to with the symbol "B". The A/D conversion of the output signal from the cable may entail over-sampling, i.e., sampling at a higher rate than the operating rate of the analog-to-digital converter 44 incorporated in the receiver 16.

(c) A deconvolution operation may then be performed with respect to the signals A, B to produce a set of coefficients C. The deconvolution may be performed, for example, by a least squares technique. The resulting coefficients may, in some embodiments, be quantized and/or the number of coefficients may be reduced to obtain a desired degree of precision.

(d) The resulting set of coefficients C may then be stored in the storage unit 80 as the pre-computed equalizer characteristic that corresponds to the cable length used in operation (b).

This procedure may then be repeated for other lengths of cable. The same desired equalizer output signal profile A may be used for all of the different lengths of cable. In some embodiments, the number of pre-computed equalizer characteristics stored in the storage unit 80 may be eight, with the pre-computed equalizer characteristics respectively corresponding to a range of cable lengths from very short (virtually "zero") to a maximum length which may be about 180 meters. In other embodiments, more or fewer than eight pre-computed equalizer characteristics may be stored in the storage unit 80. For example, in some embodiments, three pre-computed equalizer characteristics may be stored. (Storage of the respective coefficient sets C for each of the different cable lengths may not occur until all of the coefficient sets C have been determined.)

As indicated at 82 in FIG. 3, the pre-computed FFE block also includes a capability for selecting one of the pre-computed equalizer characteristics stored in the storage unit 80 on the basis of a signal received by the selection unit 82 from the AGC circuit 46 (FIG. 2A). For this purpose the selection unit 82 is coupled to the AGC circuit 46 to receive from the AGC circuit 46 a signal that is indicative of the approximate length of the cable 20 to which the receiver 16 is coupled. In some embodiments, the selection unit 82 may include a lookup table (not separately shown) to select one of the pre-computed equalizer characteristics stored in the storage unit 80 on the basis of an index signal that is indicative of the approximate length of the cable 20. The index signal may be provided in suitable form from the AGC circuit 46 or may be derived by the selection unit 82 from a signal provided by the AGC circuit 46. Such a lookup table may also constitute all or part of the storage unit 80.

Alternatively, a circuit or device other than the AGC circuit 46 may provide to the pre-computed FFE block 48 side information indicative of the length of the cable 20.

As indicated at 84 in FIG. 3, the pre-computed FFE block further includes a capability for applying the pre-computed equalizer characteristic selected by the selection unit 82 to the signal output from the analog-to-digital converter 44 (FIG. 2A). For this purpose the equalizer unit 84 of the pre-computed FFE block 48 is coupled to the analog-to-digital converter 44 and is responsive to the selection unit 82 of the pre-computed FFE block 48. The at least partially equalized output from the equalizer unit 84 is provided to the summing block 54 (FIG. 2A).

Figure 5:
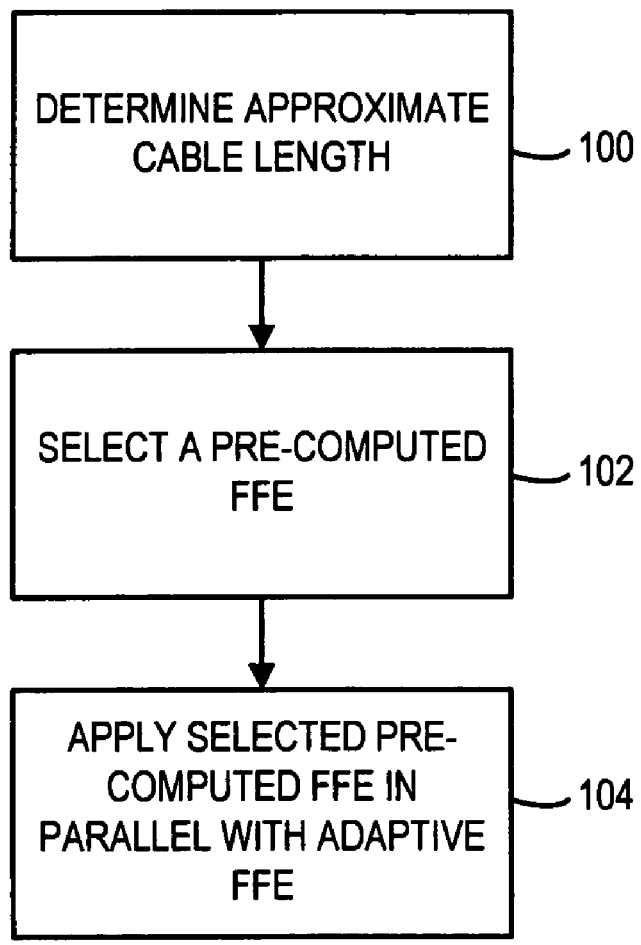
FIG. 5 is a flow chart that illustrates a process performed according to some embodiments in the receiver of FIGS. 2A and 2B.

In operation, the sending device 18 (FIG. 1) transmits a signal via the communication channel (cable) 20 to the computer system 12. The signal transmitted by the sending device 18 may, for example, be in accordance with the Gigabit Ethernet protocol. The signal transmitted by the sending device 18 experiences inter-symbol interference (ISI) while passing through the communication channel 20, and is received at the receiver 16 of the computer system 12. More specifically, referring to FIG. 2A, the signal is received via the line interface 40 of the receiver 16 and is conditioned by the receiver analog front end electronics 42. The conditioned signal is converted to a sequence of digital samples by the analog-to-digital converter 44. The resulting sequence of digital samples is supplied to all three of the AGC circuit 46, the pre-computed FFE block 48 and the adaptive FFE 52. On the basis of the sequence of digital samples, the AGC circuit 46 performs automatic gain control, and also determines an approximate length of the cable 20 (as indicated at 100 in FIG. 5). The AGC circuit provides to the pre-computed FFE block 48 a signal that is indicative of the approximate length of the cable 20. This signal is received by the selection unit 82 (FIG. 3) of the pre-computed FFE block 48.

On the basis of the signal received from the AGC circuit 46 (i.e., on the basis of the approximate length of the cable 20, as determined by the AGC circuit 46), the selection unit 82 selects one of the pre-computed equalizer characteristics that are stored in the storage unit 80 of the pre-computed FFE block 48. The pre-computed equalizer characteristic selected by the selection unit 82 may be a characteristic that corresponds to the approximate length of the cable 20. The selection of the pre-computed equalizer characteristic may occur by accessing a lookup table on the basis of the signal provided by the AGC circuit 46. In some embodiments, hysteresis may be introduced in the functioning of the selection unit 82 to aid in prevention of toggling between two adjacent cable lengths. (Selection of the pre-computed equalizer characteristic from among the pre-computed equalizer characteristics stored in the storage unit 80 is indicated at 102 in FIG. 5.)

The equalizer unit 84 of the pre-computed FFE block 48 applies the pre-computed equalizer characteristic selected by the selection unit 82 to the incoming signal for the receiver 16. It will be understood that the incoming signal is represented by the sequence of digital samples provided by the analog-to-digital converter 44. The application of the selected pre-computed equalizer characteristic may be in the form of digital filtering of the sequence of digital samples in accordance with the selected pre-computed equalizer characteristic. The resulting equalized (or partially equalized) signal is provided from the equalizer unit of the pre-computed FFE block 48 to be one of the inputs of the summing block 54. (Application of the selected pre-computed FFE equalizer characteristic is indicated at 104 in FIG. 5.)

The adaptive FFE 52 also receives the sequence of digital samples provided by the analog-to-digital converter and performs adaptive equalization of the incoming signal represented by the sequence of digital samples on the basis of an error signal provided to the adaptive FFE 52 from the signal slicer block 56. The adaptive FFE 52 may operate generally in accordance with conventional principles. However, because of the relatively high degree of equalization provided by the pre-computed FFE block 48, the adaptive FFE 52 may converge more rapidly, and/or may require less hardware (e.g., fewer gates) than would be the case where a pre-computed FFE is applied to the incoming signal without considering the length of the cable 20. (As is indicated at 104 in FIG. 5, the application of the adaptive FFE is performed in parallel with application of the pre-computed equalizer characteristic by the pre-computed FFE block.)

The partially equalized signal output from the adaptive FFE 52 is also supplied to the summing block 54 as one of the inputs for the summing block 54.

In addition to receiving the outputs from the pre-computed FFE block 48 and from the adaptive FFE 52, the summing block 54 also receives as inputs signals that are output respectively from the IIR filter 62 (FIG. 2B) and from the DFE 60 (FIG. 2B). The summing block 54 sums these four input signals and provides the resulting sum signals to the signal slicer block 56 (FIG. 2B). The output from the summing block 54 may also be provided (as indicated at 86 in FIG. 2B) to the digital signal processor 14 (FIG. 1) via, for example, a Viterbi decoder which is not shown.

Referring to FIG. 2B, the signal slicer block 56 compares the sum signals to an expected profile for the incoming signal as it is expected to appear after equalization (i.e., largely free of ISI). On the basis of this comparison, the signal slicer block 56 outputs a data signal to the DFE 60 and to the IIR filter 62. The signal slicer block 56 also outputs an error signal to the adaptive FFE 52 and to the DFE 60. As noted before, the adaptive FFE 52 operates adaptively to equalize the incoming signal on the basis of the error signal provided by the signal slicer block 56. The DFE 60 also performs an adaptive equalization function on the basis of the error signal provided by the signal slicer 56. The equalization function performed by the DFE 60 is applied to the data signal output from the signal slicer block 56, but has the effect of contributing to the equalization of the incoming signal. The output of the DFE 60 is provided to the summing block 54 as one of the inputs summed by the summing block 54.

The IIR filter 62 performs filtering with respect to the data signal output from the signal slicer block 56. As noted above, the IIR filter may be integrated with the Viterbi decoder. The filtered signal output from the IIR filter is also provided to the summing block 54 as one of the inputs summed by the summing block 54.

By selecting a pre-computed FFE characteristic on the basis of estimated cable length, or based on another channel characteristic, and applying the selected pre-computed FFE characteristic in parallel with an adaptive FFE, it may be possible for the adaptive FFE to converge more quickly than if the same pre-computed FFE characteristic were used regardless of the cable length or channel characteristic. In addition, it may be possible to provide the adaptive FFE using less hardware (e.g., fewer gates) than would be the case if a fixed pre-computed equalizer were used. The more rapid convergence that may be possible with the selected pre-computed FFE characteristic may also result in savings in power consumption, which may be of particular value if the computer system 12 is implemented as a laptop computer or other mobile device.

As an alternative to arranging the pre-computed FFE in parallel with the adaptive FFE, the pre-computed FFE and the adaptive FFE may be arranged in series.

In the above-described embodiments, detection of cable length is performed by an AGC circuit. Alternatively, other techniques, such as time domain reflectometry, may be employed to determine the approximate length of the cable.

In other embodiments, selection of one of a number of stored pre-computed equalizer characteristics may be performed on the basis of a channel characteristic other than cable length. For example, various types of channels may be tested in advance to determine suitable FFE characteristics therefor, and when it is determined to which one of the channel types the computer system is coupled, the suitable FFE characteristic for that type of channel may be selected. In still other embodiments, the number of "stubs" in the communication channel may be detected, and a suitable pre-computed FFE characteristic may be selected on that basis.

Selection of a pre-computed equalizer characteristic based on a channel characteristic may be performed with respect to virtually any communication channel that has an impulse response that varies with a physical characteristic. For example, selection of a pre-computed equalizer characteristic based on a channel characteristic may be used in conjunction with a Gigabit Ethernet channel, a Fast Ethernet channel or a 10 Gigabit Ethernet channel, as well as other types of channels.

Selection of a pre-computed equalizer characteristic based on a channel characteristic may be employed for equalizers other than a feed forward equalizer. For example, a pre-computed equalizer characteristic for a decision feedback equalizer, an infinite impulse response filter, a Kalman filter or a lattice filter may, in some embodiments, be selected based on a channel characteristic.

As used herein and in the appended claims, "equalizer characteristic" shall be understood to include a set of coefficients such as a set of filter coefficients, as well as other information and/or signals that are determinative of a frequency response of an equalizer.

The several embodiments described herein are solely for the purpose of illustration. The various features described herein need not all be used together, and any one or more of those features may be incorporated in a single embodiment. Therefore, persons skilled in the art will recognize from this description that other embodiments may be practiced with various modifications and alterations.

What is claimed is:

1. A method comprising:
   determining a characteristic of a communication channel, wherein the communication channel includes a cable and the determined characteristic of the communication channel is an approximate length of the cable;
   selecting, on the basis of the determined characteristic, a pre-computed equalizer characteristic for application to signals received via the communication channel, wherein the selecting includes selecting a pre-computed feed forward equalizer (FFE) from among a plurality of pre-computed FFEs stored in a receiver coupled to the communication channel;
   applying the selected pre-computed FFE to the signals received via the communication channel; and
   applying an adaptive FFE, in parallel with the selected pre-computed FFE, to the signals received via the communication channel.

2. The method of claim 1, wherein the approximate length of the cable is determined by an automatic gain control block.

3. An apparatus comprising:
   a first circuit, to couple to a communication channel, to determine a characteristic of the communication channel, the communication channel including a cable, the first circuit to couple to the cable, the characteristic of the communication channel determined by the first circuit being an approximate length of the cable;
   a second circuit, responsive to the first circuit, to select, on the basis of the determined characteristic, a pre-computed equalizer characteristic for application to signals received via the communication channel, the second circuit including circuitry to apply the selected pre-computed FFE to the signals received via the communication channel, wherein the second circuit stores a plurality of pre-computed feed forward equalizers (FFEs) and is capable of selecting one of the stored pre-computed FFEs on the basis of a signal received from the first circuit; and
   a third circuit to apply an adaptive FFE, in parallel with the selected pre-computed FFE, to the signals received via the communication channel.

4. The apparatus of claim 3, wherein the first circuit comprises an automatic gain control circuit.

5. An apparatus comprising:
   first means, for coupling to a communication channel and for determining a characteristic of the communication channel, the communication channel including a cable, the first means being for coupling to the cable, the characteristic of the communication channel determined by the first means being an approximate length of the cable;
   second means, responsive to the first means, for selecting, on the basis of the determined characteristic, a pre-computed equalizer characteristic for application to signals received via the communication channel;
   means for storing a plurality of pre-computed feed forward equalizers (FFEs), wherein the second means includes means for selecting one of the stored pre-computed FFEs on the basis of a signal received from the first means;
   means for applying the selected pre-computed FFE to the signals received via the communication channel; and
   means for applying an adaptive FFE, in parallel with the selected pre-computed FFE, to the signals received via the communication channel.

6. The apparatus of claim 5, wherein the first means comprises an automatic gain control circuit.

7. An apparatus comprising:
   interface means for coupling to a cable;
   storing means for storing a plurality of pre-computed feed forward equalizer (FFE) characteristics;
   automatic gain control (AGC) means coupled to the interface means for applying gain control to signals received via the cable and for determining an approximate length of the cable;
   selection means, coupled to the AGC means and to the storing means, for selecting one of the stored pre-computed FFE characteristics on the basis of a signal received from the AGC means, the signal received from the AGC means indicating the approximate length of the cable;
   first equalizer means, responsive to the selection means and coupled to the interface means, for equalizing the signals received via the cable on the basis of the pre-computed FFE characteristic selected by the selection means; and
   second equalizer means, coupled to the interface means in parallel with the first equalizer means, for adaptively equalizing the signals received via the cable.

8. The apparatus of claim 7, wherein each of the pre-computed FFE characteristics stored by the storing means corresponds to a respective cable length.

9. The apparatus of claim 8, wherein the storing means stores eight pre-computed FFE characteristics.

10. The apparatus of claim 7, wherein the interface means is for coupling to an Ethernet cable.

11. The apparatus of claim 7, wherein the interface means is for coupling to a Gigabit Ethernet cable.

12. A system comprising:
    a processor; and
    a receiver coupled to the processor;
    wherein the receiver includes:
      a first circuit, to couple to a communication channel, to determine a characteristic of the communication channel, the communication channel including a cable, the first circuit to couple to the cable, the characteristic of the communication channel determined by the first circuit being an approximate length of the cable;

a second circuit, responsive to the first circuit, to select, on the basis of the determined characteristic, a pre-computed equalizer characteristic for application to signals received via the communication channel, the second circuit including circuitry to apply the selected pre-computed FFE to the signals received via the communication channel, wherein the second circuit stores a plurality of pre-computed feed forward equalizers (FFEs) and is capable of selecting one of the stored pre-computed FFEs on the basis of a signal received from the first circuit; and a third circuit to apply an adaptive FFE, in parallel with the selected pre-computed FFE, to the signals received via the communication channel.

13. The system of claim 12, wherein the first circuit comprises an automatic gain control circuit.

* * * * *